(12) United States Patent  
Weinstein et al.

(10) Patent No.: US 7,716,711 B1  
(45) Date of Patent: May 11, 2010

(54) TELEVISION MULTIPLEXING AND TRANSMISSION SYSTEM AND METHOD

(75) Inventors: Hillel Weinstein, Haifa (IL); Zeev Orbach, Ashkelon (IL)

(73) Assignee: Xtend Networks Ltd., Airport (IL)

( * ) Notice: Subject to any disclaimer, the term of this patent is extended or adjusted under 35 U.S.C. 154(b) by 2401 days.

(21) Appl. No.: 10/048,588

(22) PCT Filed: Jul. 24, 2000

(86) PCT No.: PCT/IL00/00437

§ 371 (c)(1),  
(2), (4) Date: May 15, 2002

(87) PCT Pub. No.: WO01/10120

PCT Pub. Date: Feb. 8, 2001

(30) Foreign Application Priority Data

Aug. 1, 1999 (IL) .................................. 131192

(51) Int. Cl.  
*H04N 7/173* (2006.01)
(52) U.S. Cl. .................... 725/118; 725/86; 725/95; 455/3.05
(58) Field of Classification Search ............ 725/86, 725/91, 95, 98, 103, 105, 114, 117, 118, 725/119, 126, 127, 135, 136, 138, 139; 455/3.01, 455/3.03, 3.04, 3.05, 3.06  
See application file for complete search history.

(56) References Cited

U.S. PATENT DOCUMENTS 3,491,199 A  1/1970 Weinstein et al.

| 4,245,245 A | 1/1981 | Matsumoto et al. |
| 4,506,387 A | 3/1985 | Walter |
| 4,553,161 A | 11/1985 | Citta |
| 4,641,363 A | 2/1987 | Hasegawa |
| 4,970,722 A | 11/1990 | Preschutti |

(Continued)

FOREIGN PATENT DOCUMENTS

EP       0 577 351 A2    1/1994

(Continued)

OTHER PUBLICATIONS

Jari Peltoniemi; Video-on-Demand Overview, Internet; Jan. 30, 1995; <URL:http://www.cs.tut.fi/tit/stuff/vod/VoDOverview/vod1/html>.

(Continued)

*Primary Examiner*—Chi H Pham  
*Assistant Examiner*—Weibin Huang  
(74) *Attorney, Agent, or Firm*—Pearl Cohen Zedek Latzer, LLP

(57) ABSTRACT

A television multiplexing and transmission system and method, which is using certain portions of the standard television channel-bandwidth to superimpose additional information by phase-modulating said information using precisely-derived frequency carriers combined with reference frequencies and injecting said phase modulated electronic signals at amplitudes below the standard minimum detectable signal without affecting the simultaneous orderly operation of the same standard television channels into which the additional information is multiplexed, which system may be used to simultaneously transmit to a plurality of users various data in response to their corresponding queries, with particular applications to CATV systems, comprising a user data unit, a multiplexing and transmission unit and a alternate frequency unit.

30 Claims, 11 Drawing Sheets

U.S. PATENT DOCUMENTS

| | | | |
|---|---|---|---|
| 5,109,286 A | | 4/1992 | West et al. |
| 5,130,664 A | | 7/1992 | Pavlic et al. |
| 5,194,947 A | | 3/1993 | Lowcock et al. |
| 5,301,245 A | | 4/1994 | Endoh |
| 5,481,757 A | | 1/1996 | Mihara et al. |
| 5,587,734 A | | 12/1996 | Lauder et al. |
| 5,600,573 A | * | 2/1997 | Hendricks et al. ........... 725/109 |
| 5,724,646 A | | 3/1998 | Ganek |
| 5,768,682 A | | 6/1998 | Peyrovian |
| 5,774,458 A | | 6/1998 | Williamson |
| 5,790,806 A | | 8/1998 | Koperda |
| 5,805,804 A | | 9/1998 | Laursen et al. |
| 5,815,146 A | | 9/1998 | Youden et al. |
| 5,822,677 A | | 10/1998 | Peyrovian |
| 5,961,603 A | | 10/1999 | Kunkel et al. |
| 5,963,844 A | | 10/1999 | Dail |
| 5,999,970 A | * | 12/1999 | Krisbergh et al. ........... 725/109 |
| 6,049,539 A | * | 4/2000 | Lee et al. .................... 370/355 |
| 6,253,375 B1 | * | 6/2001 | Gordon et al. ................ 725/88 |
| 6,381,745 B1 | | 4/2002 | Paul |
| 6,393,607 B1 | | 5/2002 | Hughes et al. |
| 6,462,923 B1 | | 10/2002 | Vokey |

FOREIGN PATENT DOCUMENTS

| | | |
|---|---|---|
| EP | 0 589 531 A2 | 3/1994 |
| EP | 0 695 092 B1 | 1/1996 |
| EP | 0 742 658 A2 | 11/1996 |
| EP | 963 116 A2 | 12/1999 |
| JP | 04-196792 | 7/1992 |
| JP | 9-162818 | 6/1997 |
| JP | 11-041213 | 2/1999 |
| WO | 96/08925 A1 | 3/1996 |
| WO | 99/14953 | 3/1999 |
| WO | 99/16201 | 4/1999 |
| WO | 01/22364 A2 | 3/2001 |
| WO | 01/41890 A2 | 6/2001 |
| WO | 01/60066 A1 | 8/2001 |
| WO | 02/33969 A1 | 4/2002 |

OTHER PUBLICATIONS

SeaChange-News Internet, Jul. 11, 2001;CISCO Systems; Multimedia Traffic Engineering for HFC NB URL:http://www.searchangeinternational.com/2000/pr255.html, SeaChange—Broadband Case Study Internet, URL:http://www.seachangeinternatinal.com/case_study_broadband.html Seachange.

CISCO Systems; Multimedia Traffic Engineering for HFC Networks, a White Paper on Data, Voice, and Video over IP, Jan. 1, 1999.

Unknown, Aug. 25, 2002; Internet pages from http://www/dxcomm.com/products/Motorola.

Epcos, Jun. 8, 2002, RF Transformer Splitter and Matching Transformer.

Ciciora et al., Jan. 1, 1999, Chapters 9, 10, 13 and 14 of the book "modern Cable Television Technology, Video, Voice, and data Communications", Coaxial RF Technology, Coaxial Distribution System Design, "Return Path Interference Mitigation Techniques".

Christiansen, Jan. 1, 1997, "Electronics Engineers' Handbook" by McGraw Hill 26.57-26.66 and 25.65.

Unknown, Jan. 1, 2000, Pages from URL: http://www.eccentrix.com, http://www.divx-diaest.com, http://www.ultimateresourcesite.com, <http://www.cnet.com>.

Rath et al, Jun. 1, 1997, "Interactive Digital Video Networks: Lessons from a Commercial Deployment", IEEE Communication Magazine, IEEE Service Center. Piscataway, N.J., US, vol. 35, No. 6, pp. 70-74, XP000659191 ISSN: 0163-6804.

Economist, Sep. 17, 2001, Reality Check for Video-on-Demand, Internet <URL:http://www.economist.com/science/tq/displaystory.cfm?Story_ID=662210>.

Unknown, Jul. 11, 2001, DIVA Web Site: <URL:http://www.divata.com/HTML_mirror/products/prod_overview.html> URL:http://www.divatv.com/php/prod_link.php3, URL:http://www.diatv.com/HTML_mirror/services/serv_navigator.html>, URL:http://www.divatv.com/php/prod_server.html>.

Chism, Sep. 17, 2001, Personal Viseo Recorder (PVR) Meets Video-on-Demand (VOD) First presented at the Society of Cable Telecommunication Engineers (SCTE) 2001 Conference on Emerging Technologies by Bob Chism, Vice President, Development, Concurrent Computer Corporation.

* cited by examiner

TELEVISION MULTIPLEXING AND TRANSMISSION SYSTEM AND METHOD

BACKGROUND OF THE INVENTION

This invention relates generally to television systems and networks and more particularly to those cable-television networks and/or wireless television networks in which digital data as well as other information is transmitted through the network, combined with or superimposed on standard television signals so as to make more efficient and economical utilization of available communication channels.

The development and utilization of communication networks such as the Internet has been constrained by the bandwidth limitations of telephone networks. Consequently, the utilization of cable TV networks known as CATV as a means of carrying Internet information has been introduced so as to enable to transmit data as well as video signals of high quality. For example, EP-A-0 742 658, JP-A-04 196792, JP-A-11 041213 and EP-A-0 577 351 disclose various methods for utilizing cable TV for the transmission of additional data. JP-A-04 196792 discloses a CATV subscriber system transmission method utilizing frequency multiplexing between an incoming and an outgoing signal to and from an off premise device. JP-A-11 041213 discloses a conversion circuit converting Internet based data requests to suitable CATV transmission. EP-A-0 577 351 discloses a television signal processing system, the system assigns plural data to the amplitude or phase information in the frequency domain at the transmission side. However, present products enabling Internet users to utilize the advantage of higher-bandwidth CATV are constrained due to the various design limitations of present TV equipment. One of the principal limitations is due to the fact that TV channels were designed to transmit information from a single source to many users. Such a ubiquitous system can hardly allow for the transmission of specific messages intended for review or processing by individuals. The relative bandwidth allowed for applications, other than standard TV transmission, is small compared to the bandwidth reserved for said standard channels, i.e. 30 to 40 Mhz out of 500 to 750 Mhz. One way to overcome this bandwidth limitation and the unilateral nature of TV channels is to combine CATV and additional telephone lines so as to enable the user to send information via the telephone line while receiving information on the cable TV. One example is disclosed in EP-A-0742 658 disclosing a system which considers the multiple channels as one unit and managing such unit via a bandwidth management unit. Another example may be the so-called WebTV system. However, this hybrid solution is forcing the user to connect his terminal both to the TV line as well as to the telephone line, while the "downstream" constraints still exists.

Other ways to use CATV networks for internet applications have been suggested according to which certain channels are dedicated to Internet traffic thereby preventing their simultaneous use for conventional or other television programs, which may reduce the economic effectiveness of the given CATV network.

Furthermore, it is anticipated that in the future, the requirement for bandwidth within interactive networks, enabling users to feed back various queries or data while receiving individual responses through the TV network will increase.

In an effort to overcome constraints inherent to other techniques that have been used for interactive utilization of communication networks such as the Internet in the TV or CATV environments, this invention is proposing methods to send data within the standard TV channels so that facilities already existing for transmission of "downstream" composite TV signals may simultaneously be utilized for carrying additional individual information by superimposing corresponding additional signals on the standard existing TV composite signals without deteriorating the appearance of the video or audio components of said standard TV signals.

SUMMARY OF THE INVENTION

In accordance with the foregoing it may be regarded as an object of the present invention to provide a communication system by the use of which information may be received and transmitted via existing communication channels enabling interactive operation within such channels.

It is a further object of the present invention to provide a query or data superposition system by the use of which query and or data may be simultaneously transmitted or received within standard CATV networks or wireless TV networks.

It is a still further object of the present invention to provide multiplexing and detection techniques whereby query or data may be so added to the standard TV signal that the resulting complex waveform is circulated within a CATV network or radiated and received within a wireless TV network without any detrimental change in the effective standard TV signal, which is is simultaneously transmitted over the same standard channels through which said data is transmitted.

It is yet another additional object of the present invention to provide access to public networks such as the Internet by home users having standard CATV equipment or wireless TV equipment without requiring the use of additional telephone lines, and by deploying modified set-top terminals, thus enabling interactive operation within public networks such as the Internet and access to the World Wide Web.

It is another object of the present invention to provide a system comprising a standard television transmission system, having a transmission bandwidth. The system may comprise a head end unit and at least one hub connected to the head end unit. Each of the hubs can include: a central processing unit (CPU) for interfacing with a data storage facility for retrieving requested data and for controlling the generation of specifically allocated pairs of frequencies assigned to a subscriber upon request, by generating instruction codes used in accessing a frequency generating unit; clock frequency device to serve as a reference to frequency generation sources; a frequency generating unit for generating a reference frequency and a data carrier frequency in accordance with said instruction codes received from the CPU and in conjunction with the clock frequency device, the reference frequency and data carrier frequency are selected from a set of predetermined frequencies within pre assigned regions of the television transmission band, said carrier frequency is phase-modulated by said requested data; a combiner device for superimposing said frequency pairs and associated controls signals onto the transmission band for in parallel downstream transmission of multiple requested data to user data units, the frequency pairs are superimposed at amplitudes below the standard minimum detectable signal, the control signals include information about the frequency pairs. The user data unit can include a television receiver for receiving and displaying television signals from remote signal sources; a data remote control device for entering user requests for additional data and an is upstream device for transmitting the requests to remote signal sources in a frequency band dedicated to upstream data; a downstream module for receiving requested data. The downstream module can include (1) a frequency reference tuner and a data tuner; (2) an acquisition logic circuit for receiving control signals from a remote signal source for tuning the frequency reference tuner and the data tuner in accordance with the control signals; and (3) a demodulator device for extracting requested data from output of the tuners for the display of the data on the television receiver.

Now in accordance with the present invention these objects, and others as will become apparent in the course of the ensuing specifications, are achieved by injecting so called upstream information in CATV networks into the allowed lower 35 Mhz band while the downstream information is added to existing TV channels in a form that does not deteriorate the appearance of standard TV programs that are simultaneously broadcast, yet allows for detection of individual coded messages directed at individual users.

BRIEF DESCRIPTION OF THE DRAWINGS

A fuller understanding of the present invention and of the manner in which it operates to achieve the objects previously identified, may now best be gained by a reading of the following detailed specification, and by a simultaneous examination of the drawings appended hereto in which.

DESCRIPTION OF THE PREFERRED EMBODIMENT

The present invention provides a system for allowing the use of a television transmission system for simultaneous transmission of standard television programs and of a multiplicity of requested data to a plurality of subscribers upon request, without affecting the operation of the standard television broadcasting.

Figure 1:
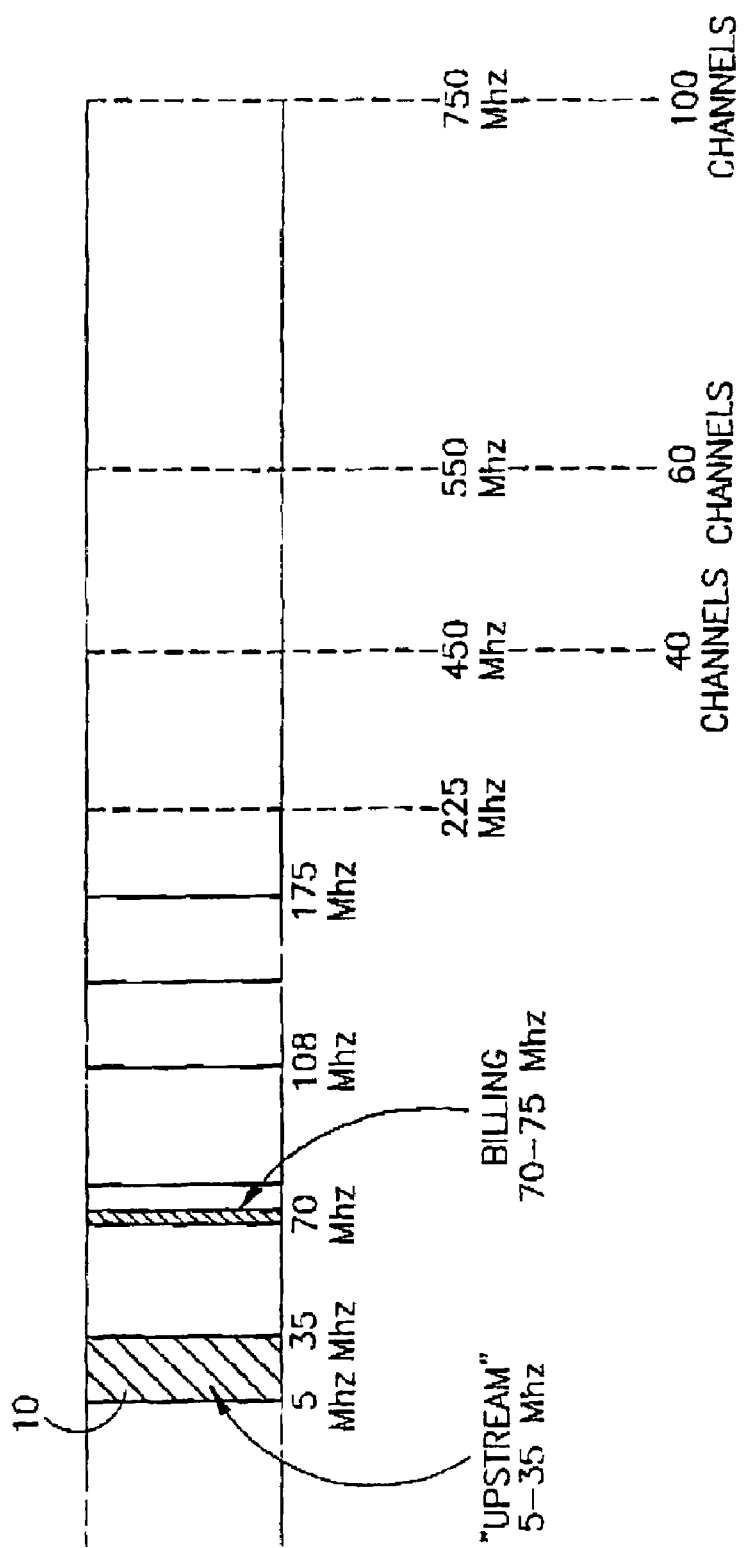
FIG. 1 is a graphical showing of the standard spectra of TV and CATV systems illustrating the frequency bandwidth allowed for "upstream" data and the so-called "Billing" band.

FIG. 1 generally depicts the spectra of standard TV systems in the US as approved by the FCC. As shown, a 60 channel system can be realized with a total bandwidth of 550 Mhz, while a 100 channel system can be realized with a 750 Mhz bandwidth. Such bandwidth is limited, and network operators have maximized the number of active, standard TV channels they use for conventional ubiquitous broadcasting to their customers. Generally, it would be quite costly to discontinue the operation of any actively broadcasting channel in order to dedicate the corresponding bandwidth to data communication such as within the Internet environment.

Whereas the utilization of the upstream band 10 in FIG. 1 (5-35 Mhz) has been proposed in the past for various data communication applications, including upstream data from individual users to the Internet, the problem of transmitting high-speed data downstream to the user via CATV has so far been solved by either using the same 5-35 Mhz band, or by dedicating certain television channels thus preventing their use for standard TV broadcasts.

Figure 2:
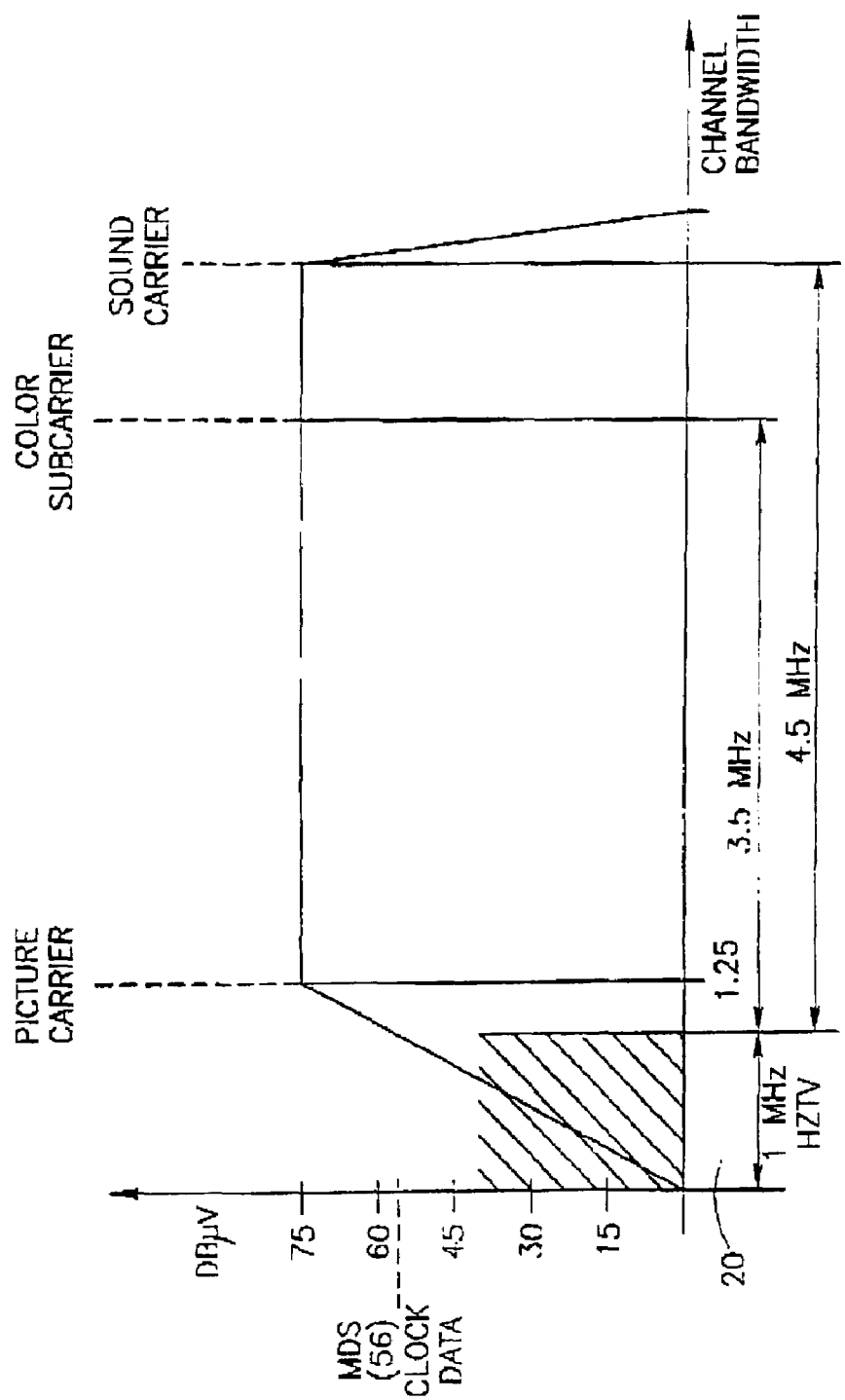
FIG. 2 is a simplified frequency spectrum of a standard TV channel used within the United States illustrating the lower frequency band and relative amplitude levels used for the injection of additional signals.

In accordance with the present invention it will be noted in connection with FIG. 2 that additional data and reference clocks can be transmitted on a standard TV channel in the specific region of the vestigial band marked 20 (will be referenced from hereon "HZTV") (0 to 1 Mhz within a given 6 Mhz channel).

Interference with the orderly operation of the standard CATV channel which under the scope of the present invention can continue to broadcast any standard TV program simultaneously with the transmission of the HZTV signals is avoided since the relative amplitudes of said data and clocks are limited as shown to 30 DB below the standard level of CATV signals i.e.—the HZTV signals are transmitted at amplitudes lower than the Minimum Detectable Signals (MDS) used as a reference by all commercial TV circuits. The frequency spectrum depicted in FIG. 2 carries certain descriptive designations and it is thought that no comment need be introduced relevant to those portions of the spectrum other than the HZTV region, in that all other aspects of the spectrum are completely conventional and well understood by those familiar with the art of television engineering.

Figure 2A:
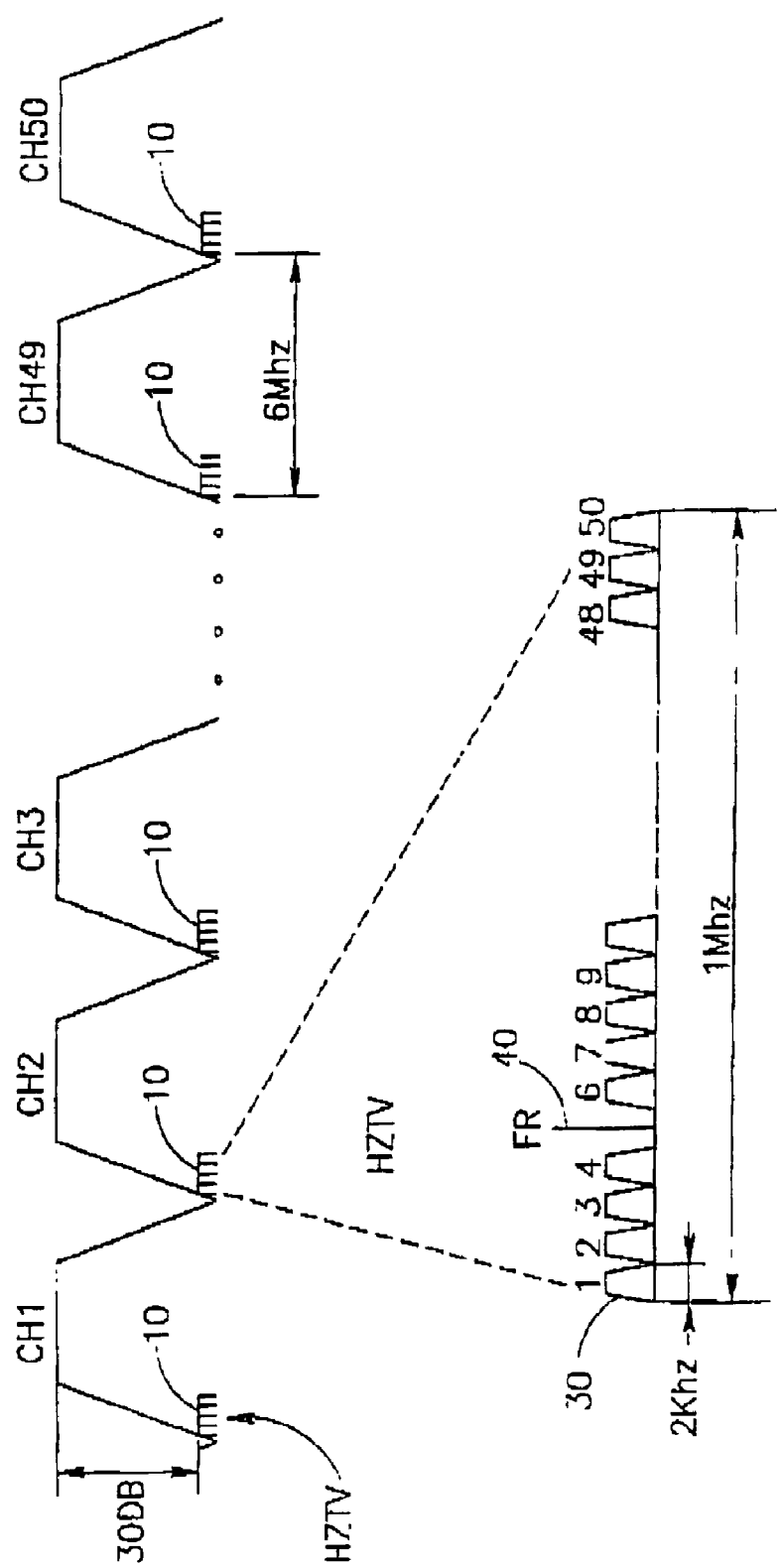
FIG. 2a is a simplified illustration of a standard 50 channel CATV overall spectra with an expansion of a possible embodiment of a specific example of data sub-carriers and clock sub-carrier.

A more detailed illustration of the manner in which data can be superimposed on a standard active TV channel is shown in FIG. 2a. In accordance with the teachings of this invention, an array of 50, 6 Mhz CATV channels is shown with each channel having its HZTV 1 Mhz sub-band located as explained in FIG. 2. A detailed drawing of one such HZTV sub-channel is shown at the bottom of FIG. 2a. In FIG. 2a the 1 Mhz region is shown to include 50, 20 Khz regions 30, and one frequency reference signal 40. It should be noted that this invention calls for said frequency reference 40 to be a very precise, stable CW signal. In the preferred embodiment of the present invention it is a pure sinusoid signal with a one hertz bandwidth. One such reference frequency, or clock is inserted in each HZTV portion 10 of any given channel, which includes 49 20 Khz regions. Each of these regions includes another precision sub-carrier, which is phase-modulated by the data to be transmitted. The higher the precision of both the clock and the data carriers, the higher the resolution of detection of the data, and the speed at which said data can be transmitted and detected.

As shown in FIG. 2a, one reference clock and 49 data sub-channels are allowed in each HZTV zone of each CATV channel. Accordingly, for the 50 channel CATV system, 2,450 independent, addressable data channels can be realized. Since a typical CATV hub serves 1000 to 2000 subscribers, we can serve in this case practically all subscribers, assuming all zones are being accessed simultaneously. Alternatively, if we would allow 500 HZTV zones or regions, each with a 2 Khz bandwidth, we would be able to simultaneously serve according to a preferred embodiment of the present invention 24,950 subscribers for a single hub. According to a preferred embodiment of the present of this invention, the CATV subscribers connected to a given hub can each receive different data streams representing 2450 different information messages from a public network such as the internet while all 50 CATV channels simultaneously transmit their corresponding 50 programs, without any noticeable deterioration of the quality of the CATV video and/or audio signals. Again, this invention prescribes precision clocks and data sub carriers to allow for such immunity to standard TV signals, in combination with phase modulation of the raw data to be transmitted at levels below the MDS.

Figure 3:
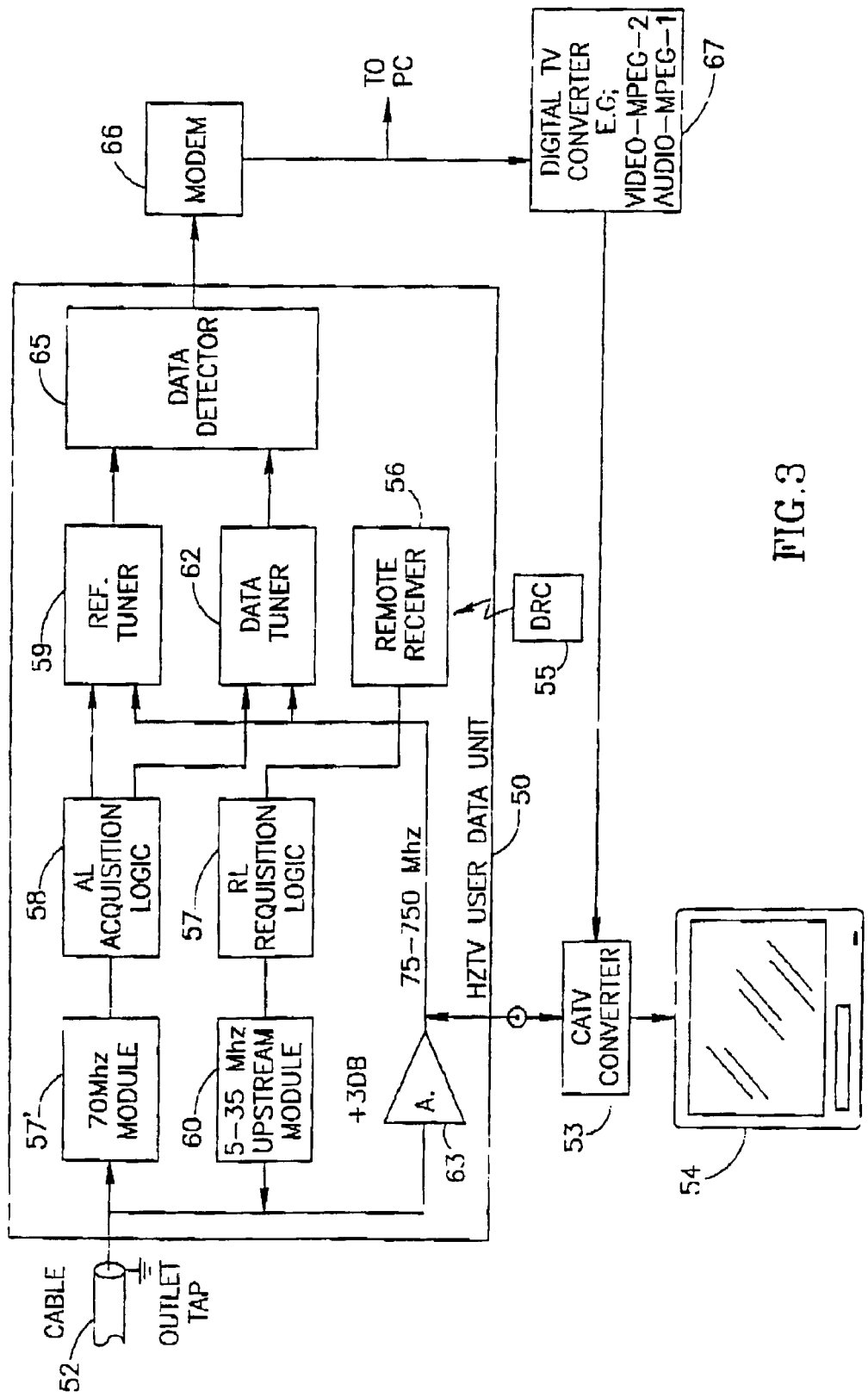
FIG. 3 is a simplified block diagram of the individual TV user Data Unit shown connected to a standard CATV cable outlet tap, a standard CATV set-top box, and a modem, in accordance with a preferred embodiment of the present invention.

Turning now to FIG. 3 where a block diagram is shown depicting how a CATV system may be operated with the addition of data in accord with the present invention. An individual subscriber data unit 50 is shown connected to a standard CATV cable outlet-tap 52 and a N set-top box 53 which is connected to a standard N receiver 54. The subscriber may initiate his request for certain information through data remote control unit (DRC) 55 by keying in his request via a keyboard located on DRC 55 which actuates remote receiver 56. Receiver 56 is feeding the requisition message to a requisition logic unit 57, which formats and controls the requisition upstream data via a 5-35 Mhz upstream module 60. Module 60 may include any modulator section of a CATV modem designed for such applications and it can operate within any standard CATV system. The requisition is fed through the CATV cable tap to an CPU connected to a local hub as shown and detailed further in FIG. 4. Based on this request generated by the individual subscriber, the CPU located at the relevant hub will allocate a specific clock frequency and a specific data carrier to this subscriber out of all available clock frequencies and available data carrier frequencies as described earlier in this invention.

The requested data and corresponding clock are transmitted by the hub via the cable. As shown in FIG. 3, about 70 Mhz module 57' which may include a demodulator section of a CATV modem is used to receive from the hub the information describing the specifically allocated pair of clock frequency and data carrier. The about 70 to about 75 Mhz was chosen here because it is reserved for billing in most CATV systems. However, it will be appreciated by those skilled in the art that any other band can be used for this purpose, such as given portion of the about 5 to about 35 Mhz described above, etc. The information describing this pair of selected frequencies is fed into acquisition logic module 58 in FIG. 3, which generates the appropriate commands to control the reference tuner 59 and the data tuner 62. Each of these tuners includes a phase-locked frequency synthesizer, which upon receipt of said commands, proceeds to tune the corresponding tuner to the allocated frequency. Accordingly, the reference tuner 59 is tuned to the allocated precise reference frequency and the data tuner 62 is tuned to pass the allocated phase-modulated data carrier. Tuner 59, which includes a is phase-locked synthesizer, receives the appropriate reference frequency f(ref) through amplifier A1, 63. The CPU associated with the given hub, instructs tuner 59, through the modules marked 57 and 58 in FIG. 3 to tune to a frequency f(t) such that the difference: $f(ref)-f(t)=f(o)$, $f(o)$ being identical to the output frequency of the data tuner 62. The hub CPU through modules 57 and 58 controls both tuners 59 and 62 in tandem, so that the output frequency of 59 is identical to the carrier frequency of 62. By way of example, assume a reference frequency of 110 Mhz was selected by the hub CPU shown in FIG. 4. The CPU commands tuner 59 to tune to 100 Mhz through its PL synthesizer so that its output will be the difference 10 Mhz signal. Simultaneously, said CPU selected a data-carrier of about 550 Mhz, which is similarly detected as an input by data tuner 62. Said CPU would thus instruct data tuner 62 through its PL synthesizer, to tune to 540 Mhz so that its output would be 10 Mhz signal which is phase-modulated by the relevant data. The outputs of both tuners are now fed into the data detector unit 65, as shown in FIG. 3. Said data detector unit is now using the reference frequency as a local oscillator, so that the data can be recovered by the following modem 66. The recovered digital data is now fed into a commercially available digital to TV converter 67, which may use MPEG2 standards for video signals and MPEG1 standards for audio signals. The TV receiver 54 can now display the receive information in accordance with the control of the set-top box. It will be appreciated by those skilled in the art that the Data Remote Control unit 55 shown in FIG. 3 could be connected to a small or hand held computer such as the so called palm computers or Personal Data Assistance computer, which includes a keyboard and may be programmed in a manner compatible with the various Internet protocols such as the TCP/IP and the Docsis standards for CATV. The output of amplifier 63 is simultaneously fed into the conventional set-top box for the usual display of standard CATV channels, which display is not affected by the transmission and/or processing of said HZTV signals as described in this invention.

Figure 4:
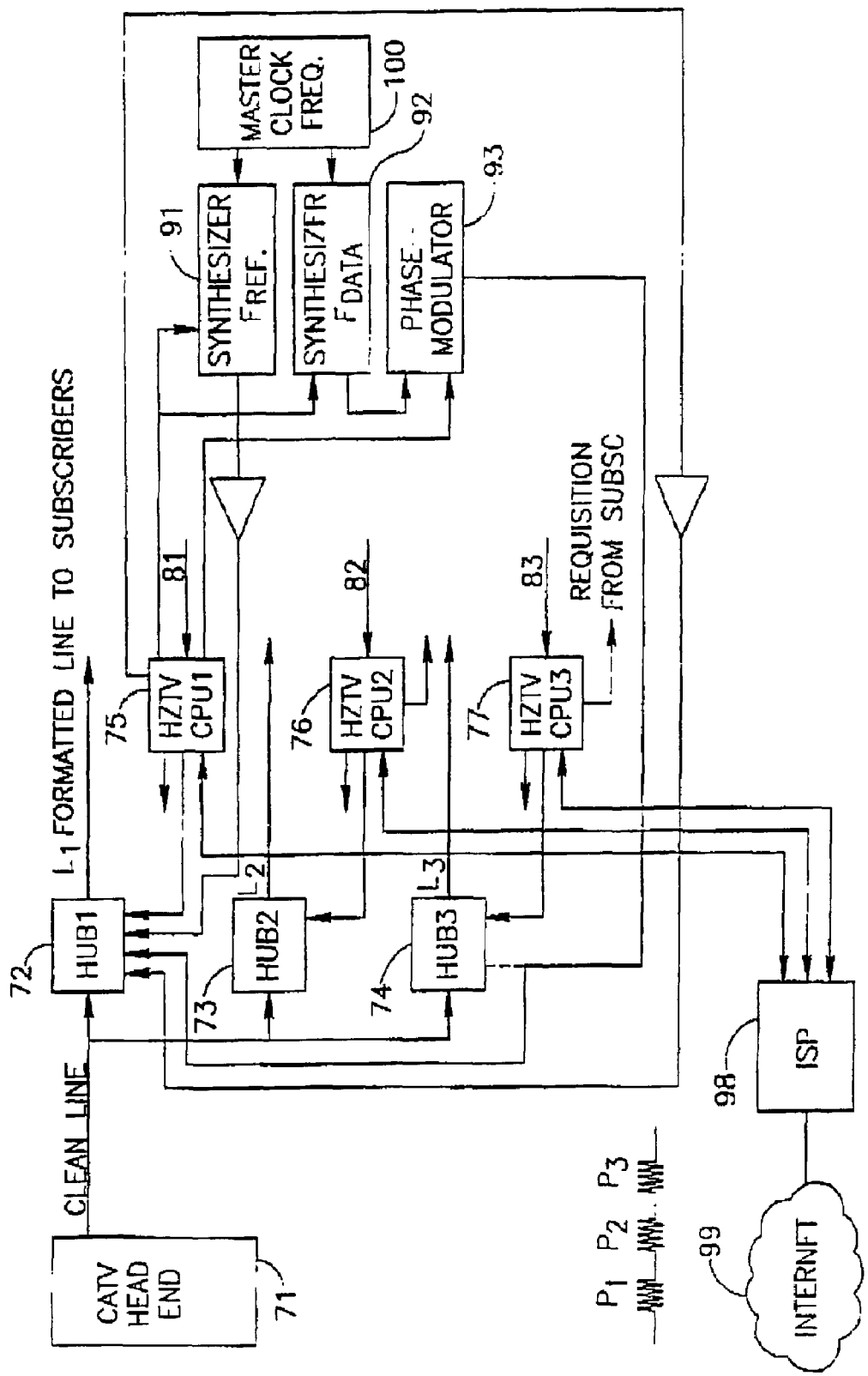
FIG. 4 is a simplified block diagram of standard CATV Head End and Hub systems expanded TV operation in an Internet environment, in accordance with a preferred embodiment of the present invention.

FIG. 4 schematically describes a preferred method of the present is invention for the insertion of additional various data messages into the CATV system in addition to the conventional operation of the CATV system. All CATV hubs, each controlling a given geographical locality, are connected to a central CATV head-end 71 from which a "clean line" carrying all conventional TV programs is feeding all hubs with said programs. Three hubs are shown connected to the head-end central unit, marked 72, 73, and 74. Each of the hubs is shown to interface to its dedicated digital computer, or CPU, marked 75, 76, and 77 correspondingly. Naturally, this invention is not limiting the number of hubs, which number can be higher or lower depending on the scope, geography, and number of subscribers. The CPU, 75, 76 and 77 is controlling all frequency assignments, timing, and interfacing between the various constituent modules of the present system at the local hub level as follows:

A subscriber issues a requisition for data from the internet 81 which is sent to the CPU 75 as described above, which requisition includes a specific address describing said subscriber related to its CATV pre-assigned code. Assuming this requisition was initiated by a subscriber located in a region served by hub 1 (72) the CPU 75 assigns a pair of frequencies, one reference frequency and one data carrier taking into account all frequencies that have been assigned already, and in accordance with a given bank of such frequencies stored in its memory, which bank is computed in accordance with the method described in the present invention. The digital representations of said frequencies are fed into the phase-locked synthesizers 91, 92 and 93. Synthesizer 91 accepts the code describing the given reference frequency and generates the same based on a precision master clock 100. Synthesizer 92 accepts the digital code for the desired carrier frequency and proceeds to generate the same in reference to the same master clock 100. Said carrier frequency is now fed into phase-modulator 93 whose output is now representative of the data to be transmitted to the subscriber. Said data was obtained from the Internet 99, through a local Internet Service Provider (ISP) 98, via the CPU which accessed the world wide web upon receipt of requisition 81 from the subscriber. Upon receipt of the various Internet packets addressed to the subscriber, CPU1 (75) proceeds to feed a specific data packet to the appropriate phase modulator such that the modulated data carrier together with its corresponding reference-frequency are fed to hub 1 (72) for transmission through the cable network to the given subscriber as described above.

A response message to the subscriber requisition is thus assembled in a manner compatible with the Internet protocol. It will be evident to the person skilled in the art that other databases or other data sources can be used, replacing the Internet, the data from which can thus be displayed on conventional TV receivers operating within a CATV system in accordance with the teachings of this invention.

Figure 4A:
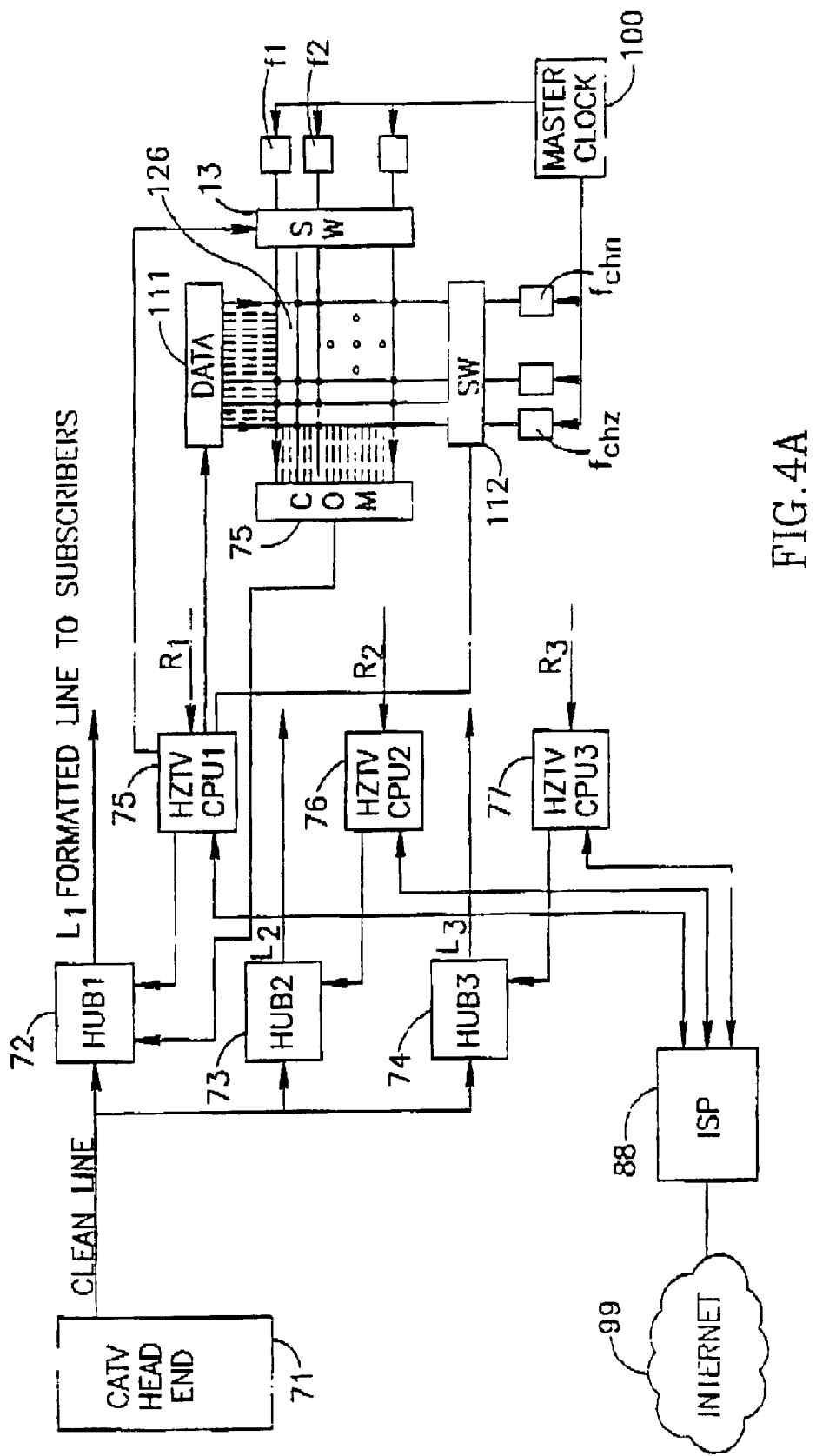
FIG. 4a is a simplified block diagram of standard CATV Head End and Hub systems with parallel transmission of a multiplicity of messages and/or programs, in accordance with a preferred embodiment of the present invention.

Yet another embodiment of this invention for the transmitting end is shown in FIG. 4a. In FIG. 4a, a plurality of frequency-references together with corresponding phase-modulated data carriers is shown to be generated and transmitted by the CPU, serving many hub subscribers simultaneously. In this case, a frequency-selection matrix 126 is shown to generate the required reference frequencies as well as the phase-modulated carrier frequencies and feed them to combiner 115 which in turn feeds signal pairs and associated addresses to the hub for transmission to a plurality of subscribers. Such selection is achieved by combiner 115 through selection of columns and rows through the use of switches 112, 113 from data decoder 111 from CPU 75. Such selection is described in detail in FIG. 4b which offers an amplification of the frequency selection matrix 126 and its associated elements. A precision master clock 100 is connected to a column of 50 phase-locked oscillators, 118, 119 and 200 spaced about 20 Khz apart, connected to the x rows x1, x2, x3 etc. The same master clock 100 is serving as a reference to 50 phase-locked frequency oscillators, 116 to 117 starting from channel 2, at about 46 Mhz, spaced about 6 Mhz apart, connected to y columns y1, y2, y3 etc. At the intersection of each x(i),y(j) line junction, there a mixer-modulator element as shown in FIG. 4c which when selected through diodes Dx 120 and Dy 121 being biased by the full conducting voltages, will generate a frequency f1+f2 by mixer element 123 whose x input is a frequency f1=m×20 Khz where k is any integer from 1 to about 50 and whose y input is a frequency f2=k×6 Mhz where k is an integer from 1 to about 50. Each such x(l)y(j) element, of which there are 50×50=2,500, has a phase modulator 124 connected to said mixer 123 and the output of a logical "and" gate 125 as shown in FIG. 4c. Said "and" gate 125 is fed by two inputs: the first input is simply the data stream, and the second input is a selection signal issued by the CPU which signal is indicative of selecting this particular frequency as a carrier frequency to be modulated by the relevant data. The output of phase-modulator 124 is thus either a clean frequency to be used as a reference frequency, or a phase-modulated carrier, all within the framework of this invention.

Figure 4B:
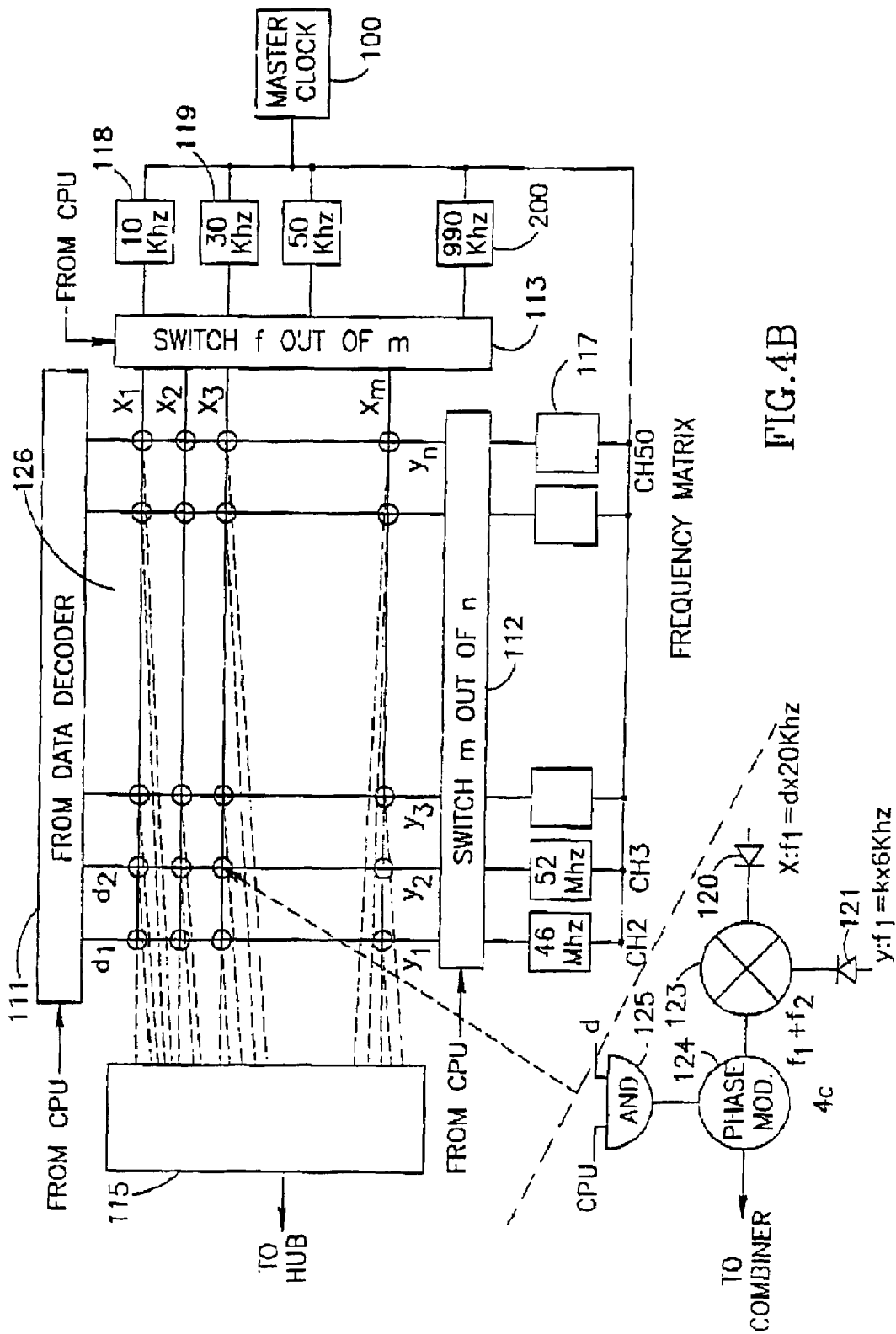
FIG. 4b is a schematic representation of the frequency selection matrix, which offers means to implement the corresponding representation in FIG. 4a. The insertion in left lower corner of the figure is a block diagram of the mixer-modulator element in accordance with a preferred embodiment of the present invention.

As indicated in both FIGS. 4a and 4b, the outputs of all x(l)y(j) elements within the matrix 126 are fed into a combiner 115, which in turn inputs all the selected frequency-pairs into the hub for transmission within the formatted line to the various subscribers. Each individual subscriber continues to filter out and decode his specifically assigned message, in response to his query in a manner described above in this invention.

It will be appreciated by those skilled in the art that while reference has been made to a TV receiver, on which the transmitted data to the individual subscriber is displayed, one can use various other receiving or display means such as a common PC, as shown in FIG. 3.

Moreover, the specific frequency zones shown in FIG. 2a as 1 Mhz strips located in the vestigial side-band of a standard TV channel, can be expanded to include the higher end of the spectrum, which is not used for active channel assignments. For example, if a 750 Mhz CATV system is used. The frequency band above 750 Mhz can be used for transmission by assigning additional frequency zones spaced 1 Mhz apart, and dividing each such zone into sub-channels that may be spaced 20 Khz apart, deploying the data multiplexing and detection techniques in accordance with the teachings of the present invention.

Figure 5A:
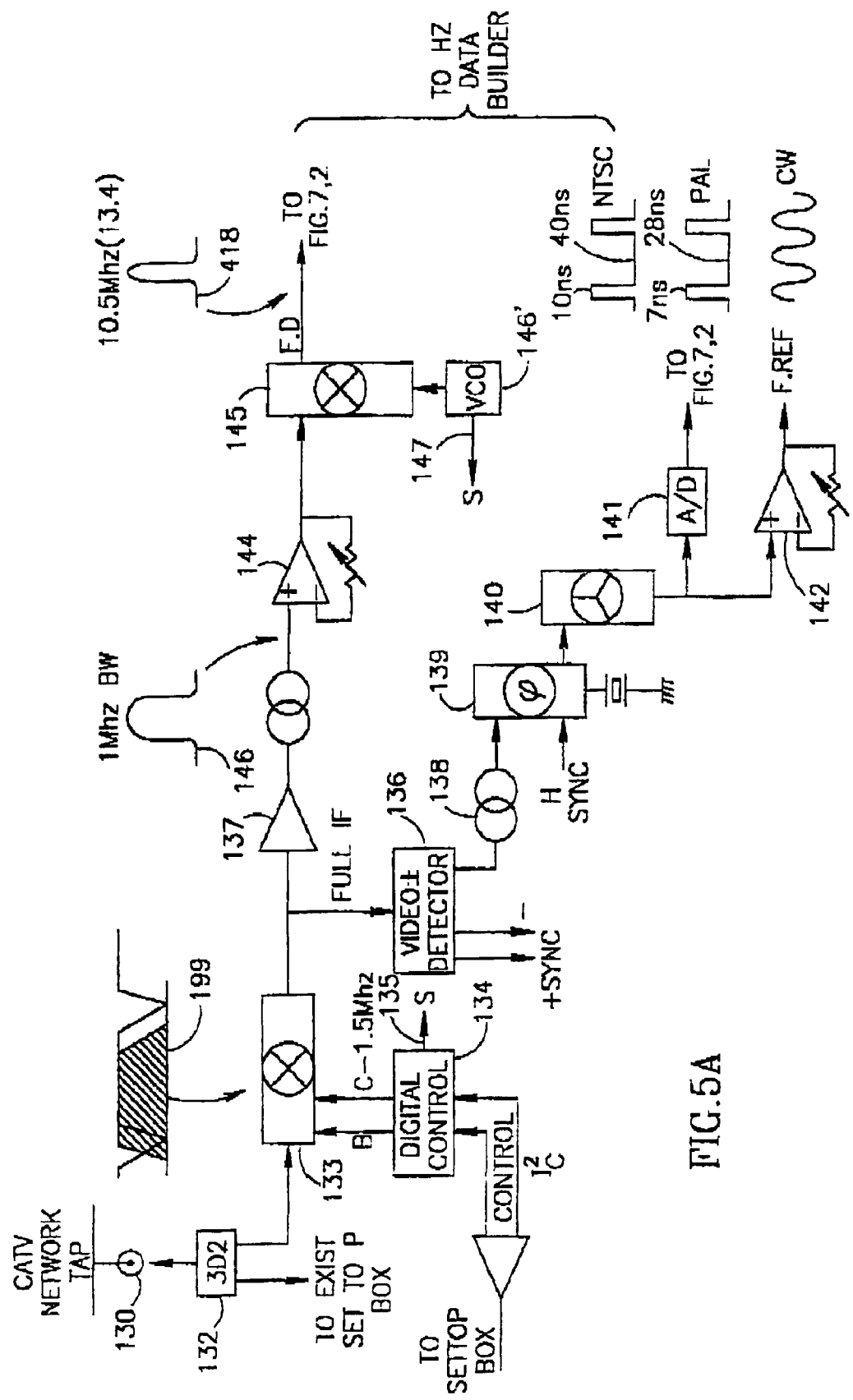
FIG. 5A describes the Subscriber Receive RF unit, while FIG. 5B describes the CATV Data Transmission to selected subscribers.
Figure 5B:
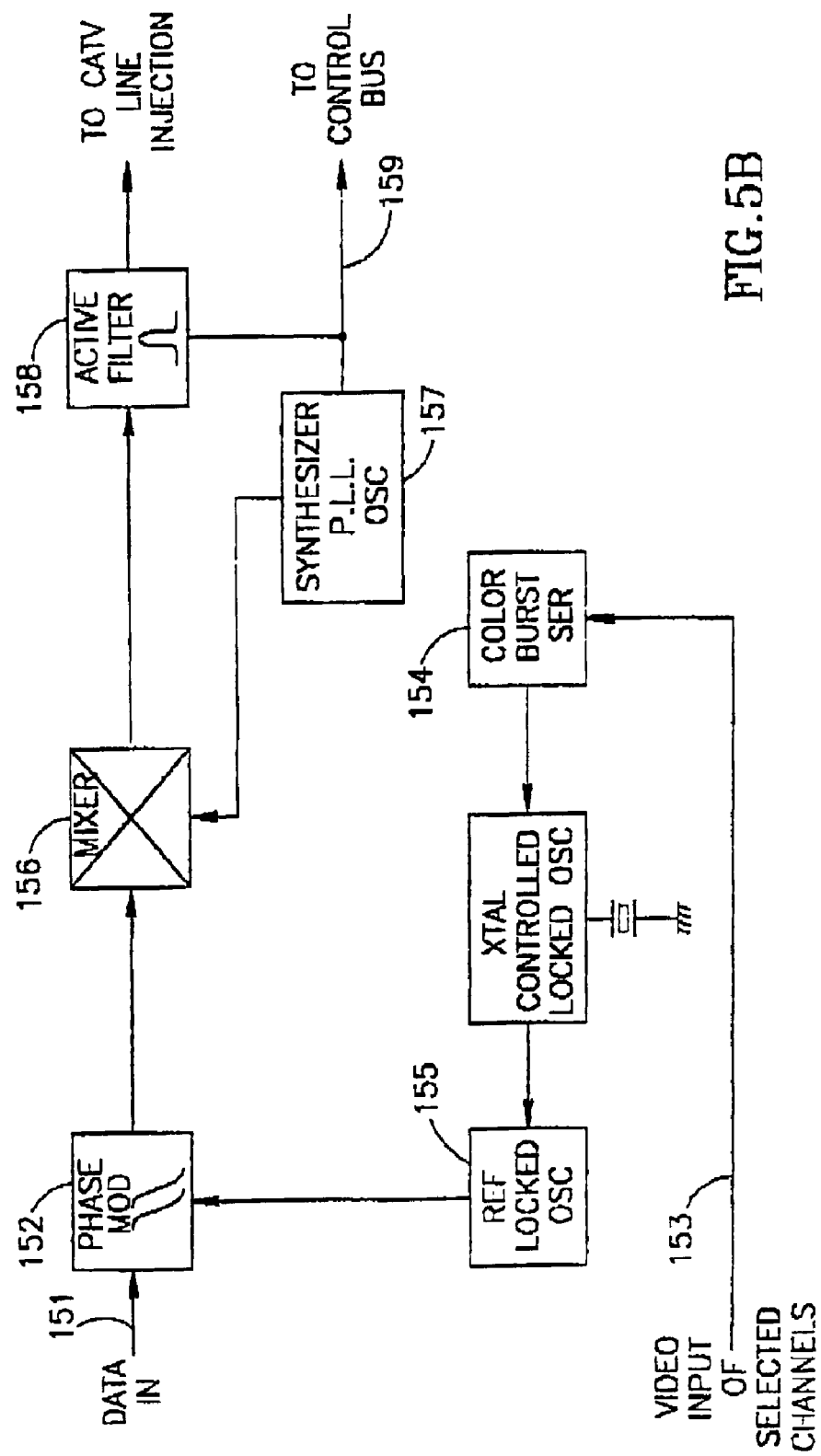

Yet another realization of the teachings of the present invention is depicted in FIG. 5A which illustrates the subscriber receive RF section, and its corresponding FIG. 5B, which illustrates the RF CATV Transmitting unit attached to a CATV Hub or Head End unit. The input to a CATV network tap 130 in FIG. 5A. Splitter 132 can be a 3 DB standard TV signal divider feeding a standard CATV set-top box, while its second output feeds the RF section tuner 133. Tuner 133 may be a standard CATV wide-band tuner controlled by digital control unit 134 which in turn is controlled by said set-top box. The about 36 Mhz output of tuner 133 is fed into a video detector 136 and an about 36 Mhz, 1 Mhz bandwidth filter 137. Video detector 136 is providing horizontal and vertical bipolar synch pulses and also provides via filter 138 the TV color burst which synchronizes a crystal controlled locked oscillator 139 to the phase of the color burst. The output of said oscillator 139 is driving a tripler (or alternatively a doubler) 140 which in turn is feeding an A/D converter 141 thus forming a clock 142 having a frequency of about 21 Mhs (NTSC) or about 27 Mhs (PAL), which is fed to the data HZTV Data Builder at input 2 (see FIG. 7 below).

The locked oscillator reference frequency 139 via tripler (or doubler) 140 is feeding an equalization amplifier 142 which creates an about 1 V rms reference signal at about 10.5 Mhz (NTSC) or abut 13.4 Mhz (PAL). In this case the third harmonic of the color carrier was chosen. However, any other harmonic may also be selected, e.g.—first, second or third harmonic. These signals feed the data builder FIG. 7 at input 171. The input to filter 137 is passing a 30 DB attenuator. The output of filter 137 described above is feeding an equalizer amplifier 138 which in turn drives mixer converter 139 with an about 1 V rms signal 144. Said signal 144 includes for example 50 data channels of about 20 Khz bandwidth each, or 500 data channels of about 2 Khz bandwidth each. Said data channels are fed into $2^{nd}$ mixer converter 145 which is also fed by VCO 146 as controlled by signal S (147) described in further detail in FIG. 6, thus creating the data-modulated signal 148 which is about 10.5 Mhz (NTSC) or about 13.4 Mhz (PAL). Said signal 148 is fed into the phase shift detector amplifier input 172 in FIG. 7.

The spectral illustration 149 shows the tuning of tuner 133 controlled by S signal 147 which can set the tuner for operation within the vestigial sideband 1 Mhz zone, or any other desired portion of the selected channel spectra. VCO 146 can exclude certain frequencies such as the video color carrier and the audio sound carrier via S command 147. The complementary FIG. 5B describes the HZTV Transmitting unit of Data to subscribers. Data 151 is fed into balanced modulator 152 which receives reference signal from reference locked oscillator 155 and drives mixer 156 with its data-modulated signal output. Reference locked oscillator 155 is controlled by a crystal locked oscillator mastered by the color burst separator 154. Separator 154 is fed by the video signal of the selected channel. Mixer 156 is driven by synthesizer PLL oscillator 157 to produce a new carrier modulated signal which is passing an active filter 158 and injected to the CATV line. Synthesizer 157 and active filter 158 are both controlled by computer bus 159, which specifically allocates chosen subscriber frequencies.

Figure 6:
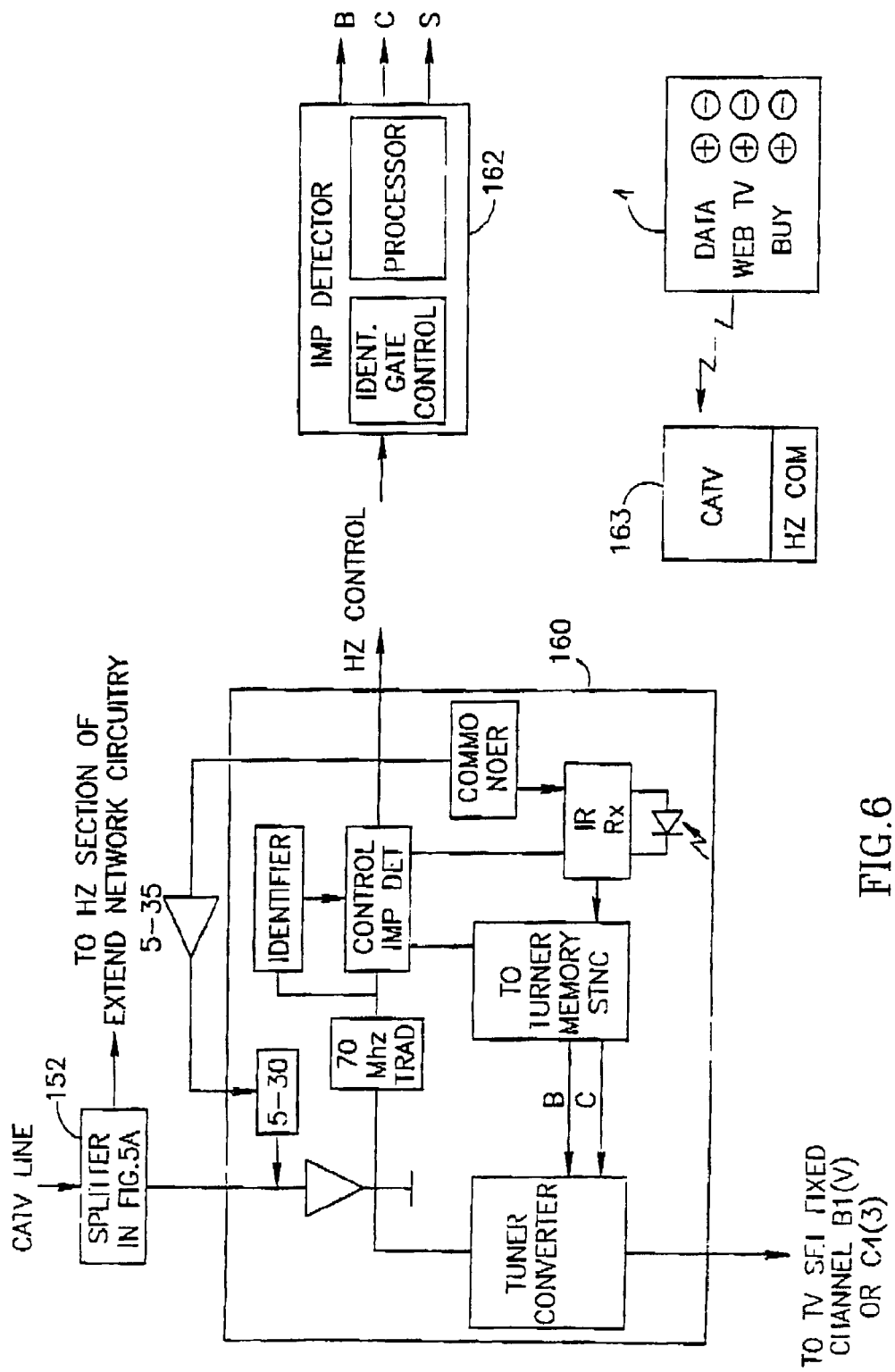
FIG. 6 further illustrates the block diagram of the modifications of CATV set-top boxes and corresponding remote-control units in accordance with teachings of this invention.

FIG. 6 entitled command control illustrates certain modification and ad-on to a standard CATV set-top box in accordance with a preferred embodiment of the present invention. The principal operation of the command control unit is based on three modifications: The original set-top box 160 is connected to the HZTV impulse detector 162 via the about 70 Mhz impulse line of the standard set-top box. Unit 162 consists of a digital identifier and a processor creating the S17 control bus to the HZTV data unit FIG. 5A. Remote control unit 163 is adapted to carry command touch controls for Internet operation or data acquisition as in 164. Command control unit enable the subscriber to choose his desired mode yet it enables the CATV operator to identify and authorize the specific service.

Figure 7:
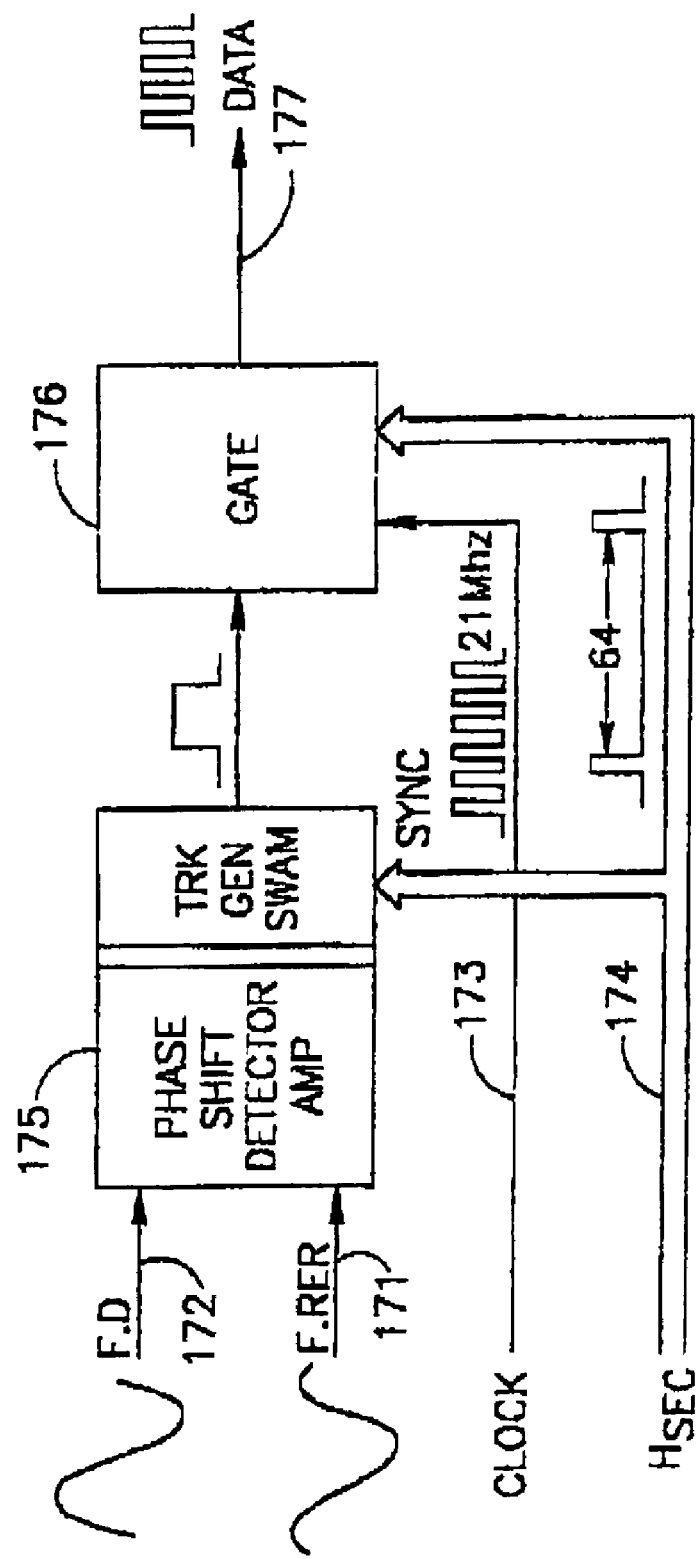
FIG. 7 presents a simplified data recovery method of the subscriber unit.

FIG. 7 illustrates HZTV data recovery unit. This unit consists of a balanced phase shift demodulator 175, e.g. Motorola 1496 and the like, with a trigger generator shaper driving gate 176 to receive the recovered data 177. Balanced demodulator 175 is fed by the data modulated carrier 172 and reference signal 171 corresponding to the same lines in FIG. 5A. Gate shaper 176 receives clock 173 and H synch 174 corresponding to the same signals in FIG. 5A. The recovered output data 177 can be fed into a PC modem, a communication port and the like.

Having thus described the present invention it should be evident that those skilled in the art may now readily devise numerous modifications thereof and variations thereupon without yet departing from the true scope of the teaching. Accordingly, the present invention set herein should be broadly construed and limited only by the scope and spirit of the claims now appended hereto.

What is claimed is:

1. A system for allowing the use of a television transmission system having a transmission band for simultaneous transmission of standard television programs and of a multiplicity of requested data to a plurality of subscribers upon request, without affecting the operation of the standard television broadcasting, the system comprises a standard television transmission system comprising a head end unit and at least one hub connected to the head end unit, wherein the at least one hub includes:

at least one central processing unit (CPU) for interfacing with a data storage facility for retrieving requested data and for controlling the generation of specifically allocated pairs of frequencies assigned to a subscriber upon request, by generating instruction codes used in accessing a frequency generating unit;

a clock frequency unit to serve as a reference to frequency generation sources;

a frequency generating unit for generating a reference frequency and a data carrier frequency pairs in accordance with said instruction codes received from the at least one CPU and in conjunction with the clock frequency unit, the reference frequency and data carrier frequency are selected from a set of predetermined frequencies within pre assigned regions of the television transmission band, the carrier frequency is phase-modulated by said requested data;

a combiner for superimposing the frequency pairs and associated controls signals onto the transmission band for in parallel downstream transmission of multiple requested data to user data units, the frequency pairs are superimposed at amplitudes below the standard minimum detectable signal, said control signals include information about said frequency pairs.

2. The system as set forth in claim 1 further comprising at least one user data unit, the user data unit comprises:

an upstream module for transmitting data requests to remote signal sources in a frequency band dedicated to upstream data; and a downstream module for receiving requested data, the downstream module includes a frequency reference tuner; a data tuner; an acquisition logic for receiving control signals from a remote signal source for tuning said frequency reference tuner and said data tuner in accordance with said control signals; and a data detector for extracting data from output of said tuners.

3. The system as set forth in claim 2 wherein the data user unit further comprises a data remote control unit for entering user requests for additional data and a television receiver unit for receiving and displaying television signals from remote signal sources.

4. The system as set forth in claim 3 wherein the data remote control unit is connected to upstream modulator module via a requisition logic module to process said requests.

5. The system as set forth in claim 4 wherein the data remote control unit further comprises a digital processor to enable according to said control signals a selection of a subchannel frequency.

6. The system as set forth in claim 2 wherein said system is a CATV (Cable Television) system utilizing a plurality of transmission channels.

7. The system as set forth in claim 2 wherein the remote signal source is a CATV hub.

8. The system as set forth in claim 2 wherein the data storage facility is the Internet.

9. The system as set forth in claim 2 wherein said frequency generating unit comprises a master frequency clock used as reference for frequency generators and a frequency selection matrix comprising a row of frequency generators spaced by a predetermined increment apart and by an array of column frequency generators, said matrix interfacing with corresponding row and column switching means which drive said matrix under the control of the CPU such that at any given X,Y element of said matrix a mixer unit is connected through diode selection means, said mixer is adding a selected row frequency to a selected column frequency and modulates the resultant frequency with data.

10. The system as set forth is claim 9 wherein the predetermined increment is 20 KHz.

11. The system as set forth in claim 2 wherein said system is a CATV system utilizing a plurality of 6 MHz transmission channels.

12. The system as set forth in claim 2 wherein the pre-assigned regions of the television transmission band are the collection of the 1 MHz lower vestigail side of each of said channels.

13. The system as set forth in claim 12 wherein the pre-assigned regions further include the frequency band of the upper limit frequency of the given transmission system.

14. The system as set forth in claim 2 wherein said user data unit further comprises a set-top converter unit for receiving signals from CATV outlet means.

15. The system as set forth in claim 2 wherein the downstream module unit of the user data unit further comprises a communication device, having a standard digital to TV converter unit, interfacing with a set-top box for the formatted display of the received requested data on a standard display unit.

16. The system as set forth in claim 2 wherein the frequency reference tuner and the data tuner include phased-locked frequency synthesizer for tuning the frequency reference tuner and the data tuner in response to receipt of commands.

17. The system set in claim 2 wherein further comprising an amplifier for providing a frequency to the frequency reference tuner.

18. The system as set forth in claim 2 wherein the user data unit further comprises a modem for recovering requested data.

19. The system as set forth in claim 2 wherein the user data unit further comprises a standard digital to TV converter interfacing with said set-top box for the formatted display of the received requested data on a standard display unit.

20. The system as set forth in claim 2 wherein the frequency band dedicated to upstream data is substantially the 5 to 35 MHz band.

21. The system as set forth in claim 2 wherein the downstream control signals are transmitted in substantially the 70-75 MHz band.

22. The system as set forth in claim 2 wherein said user data unit further comprises alternate synchronization and timing circuits.

23. The system as set forth in claim 22 wherein said alternate synchronization and timing circuits based on the derivation of the reference frequency from existing color burst signal available in standard receiving devices.

24. The system as set forth in claim 2 wherein the combination of both transmission and reception of the signals carrying video, audio, and data information phase modulating sub-carrier frequencies locked on the standard TV color carrier frequency with frequency references locked on said color carrier frequencies present in any conventional television signal.

25. A system for allowing the use of a television transmission system for simultaneous transmission of standard television programs and of a multiplicity of requested data to a plurality of subscribers upon request, without affecting the operation of the standard television broadcasting, the system comprises:
  (a) a standard television transmission system, having a transmission bandwidth, comprising a head end unit and a plurality of hubs connected to said head end unit, wherein each of said hubs includes:
    (i) a CPU means for interfacing with a data storage facility for retrieving requested data and for controlling the generation of specifically allocated pairs of frequencies assigned to a subscriber upon request, by generating instruction codes used in accessing a frequency generating unit;
    (ii) clock frequency means to serve as a reference to frequency generation sources;
    (iii) a frequency generating unit for generating a reference frequency and a data carrier frequency pairs in accordance with said instruction codes received from said CPU and in conjunction with said clock frequency means, said reference frequency and data carrier frequency are selected from a set of predetermined frequencies within pre assigned regions of the television transmission band, said carrier frequency is phase-modulated by said requested data;
    (iv) a combiner means for superimposing said frequency pairs and associated controls signals onto said transmission band for in parallel downstream transmission of multiple requested data to user data units, said frequency pairs are superimposed at amplitudes below the standard minimum detectable signal, said control signals include information about said frequency pairs;
  and
  (b) at least one user data unit including
    (i) a television receiver means for receiving and displaying television signals from remote signal sources;
    (ii) a data remote control means for entering user requests for additional data and an upstream means for transmitting said requests to remote signal sources in a frequency band dedicated to upstream data;
    (iii) a downstream module means for receiving requested data, said downstream module means includes (1) a frequency reference tuner and a data tuner; (2) an acquisition logic means for receiving control signals from a remote signal source for tuning said frequency reference tuner and said data tuner in accordance with said control signals; and (3) a demodulator means for extracting requested data from output of said tuners for the display of said data on said television receiver means.

26. A television multiplexing and transmission system which is using certain portions of the standard television channel-bandwidth to superimpose additional information by phase-modulating said information using precisely-derived frequency carriers combined with reference frequencies and injecting said phase modulated electronic signals representative of said additional information at amplitudes below the standard minimum detectable signal without affecting the simultaneous orderly operation of the same standard television channels into which said additional information is multiplexed, which system may be used to simultaneously transmit to a plurality of users various data in response to their corresponding queries, with particular applications to CATV systems, comprising:
  (I) a user data unit including
    (a) standard television receiver means which may display any standard TV program connected to CATV set-top box converter means used to receive signals from CATV outlet tap means,
    (b) data remote control means used for entering user queries identified by specific subscriber code for additional data and/or TV programs which is connected to requisition logic means and upstream modulator means which proceed to transmit said query to the CATV hub and its associated CPU means in a frequency band dedicated to upstream data,
    (c) downstream module means which includes demodulator and acquisition logic means used for transmitting control signals from the hub CPU to tune frequency reference tuner and data tuner means, which together with CPU assigned corresponding frequencies are used to feed derived tuners output to data detector means,
    (d) modem means accepting said data and feeding a standard digital to TV converter means which interface to set-top converter means for the display of received information in accordance with the data remote control request without interfering and/or deteriorating from the quality of the standard program simultaneously received and/or displayed on the standard television receiver means;
  (II) a multiplexing and transmission facility including
    (a) standard CATV transmission system comprised of a head end unit feeding a plurality of hubs, each of which hubs is connected to a digital computer or CPU providing means used to control the generation of specifically assigned pair of frequencies assigned to each subscriber upon receipt of its requisition for data and to control the tuning of the subscriber user data unit, and to interface with the data base from which said data is retrieved, which data base may be accessed through the internet network via a local ISP, (b) master clock frequency means used to serve as a reference to all frequency generation sources and frequency synthesizers means used to generate specific frequencies in the assigned regions of the television frequency spectrum thus forming reference frequency and data carrier frequency pairs said data carrier frequency being phase-modulated by the data to be transmitted to the individual subscriber via modulator means and transmitted together with its corresponding reference frequency via the hub to be received by said user data unit, (c) alternate frequency selection matrix means connected to the precision master clock and simultaneously generating said reference frequency and modulated data carrier pairs in accordance with instruction codes received from said CPU's, which codes are controlling access to row and column switches means with column switch means feeding 6 Mhz spaced channel frequencies to be added to the subchannel 20 khz spaced frequencies and modulated by the data in accordance with said CPU command so that the output of said matrix means is fed to combiner means which proceeds to transmit said information through the CATV hub to be received and demultiplexed by a plurality of subscribers each receiving his individual message without affecting the quality of standard transmitted television programs which programs use the same standard 6 Mhz channels through which said additional data was simultaneously transmitted.

27. A television multiplexing and transmission system as defined in claim 26 wherein:

(a) said user data unit is using the 5 to 35 Mhz band to transmit upstream data to the hub CPU and 70 to 75 Mhz band to transmit CPU control signals back to the user cata unit, said user data unit includes means to retrieve the data received by the user from the Internet or from any other data base to which said CPU means are connected which means include a reference tuner and a data tuner operating in accordance with the teachings of this invention and feeding a phase data detector which detects the data and feeds it to a modem;

(b) said multiplexing and transmission facility includes a master clock frequency generating a precise and stable cw pure sinusoidal signal frequency which is used a reference by all relevant synthesizers and other phased-locked frequency sources, said master clock connected to frequency synthesizers controlled by the hub CPU and generating at any given instant for the relevant user both his particularly assigned reference frequency and its corresponding data subcarrier as described in this invention, with possible multiple pairs of such synthesizers means operating in parallel serving a plurality of subscribers simultaneously under the control of said CPU.

28. A television multiplexing and transmission system as described in claim 27 wherein:

(a) frequency generation means are provided by a frequency generation matrix which matrix is comprised of said master frequency clock used as a reference by a array of row frequency generators spaced 20 Khz (or any other predetermined increment) apart and by an array of column frequency generators which interface with corresponding row and column switching means which drive said matrix means under the control of said CPU means such that at any given X,Y element of said matrix a mixer unit is connected through diode selection means, which mixer is adding a selected row frequency to a selected column frequency and proceeds to modulate the resultant frequency with data when instructed so by said CPU;

(b) means for selection of each resultant frequency present on any given X,Y element of said frequency selection matrix to phase modulate relevant data intended to be transmitted to any given subscriber by "logical and" combining the CPU selection command with said data and feeding the resultant output to a phase modulator which is connected to combiner means interfacing with the relevant hub of the CATV network.

29. A television multiplexing and transmission system as defined in claim 28 wherein the downstream data is transmitted as described in this invention at amplitudes below the MDS in the frequency band above the upper limit frequency of the given CATV system, i.e. if said upper limit is say 750 Mhz, transmit data to subscribers in subcarrier regions allocated between 750 Mhz and 800 Mhz by using same reference frequency and data subcarrier pairs as assigned by the CPU means from said given so-called roll-off band which is not used for standard CATV program transmission and may be advantageously used by this HZTV system.

30. A television multiplexing and transmission system as defined in claim 29 wherein:

said user data unit may include alternate synchronization and timing circuits included within the subscriber receive unit based on the derivation of the reference frequency from the existing standard color burst signal available in any TV receiver, and the recovery of the multiplexed data by means of phase detection of the phase modulated data which is being transmitted via a data carrier locked to the same basic color carrier signal, as combined with said reference frequency;

said transmitting facility, located for example at a CATV hub and/or headend center, generates selected user reference frequencies locked to the standard TV color burst in parallel to the phase-modulation of chosen user data on specific user (subscriber) subcarrier frequencies which are also locked on the TV color burst frequency;

data remote control unit (subscriber command control) unit interfacing with a standard TV settop box, including a digital processor which based on HZTV control signals enables selection of desired user (subscriber) subchannel frequency, and select the channel chosen for the specific data transmitted with the corresponding required offset band;

the combination of both transmission and reception of data and/or video and/or audio signals which are phase modulating subcarrier frequencies locked on the standard TV color carrier frequency together with frequency references that are also locked on said color carrier frequencies present in any composite conventional TV signals.

* * * * *